United States Patent [19]

Nakamura et al.

[11] Patent Number: 4,517,565

[45] Date of Patent: May 14, 1985

[54] APPARATUS FOR VISUALLY INDICATING THE CURRENT LOCATION OF AN AUTOMOTIVE VEHICLE

[75] Inventors: Yukinobu Nakamura; Katsutoshi Tagami; Tsuneo Takahashi, all of Saitama, Japan

[73] Assignee: Honda Giken Kogyo Kabushiki Kaisha, Tokyo, Japan

[21] Appl. No.: 408,273

[22] Filed: Aug. 16, 1982

[30] Foreign Application Priority Data

Aug. 21, 1981 [JP] Japan .................. 56-130941

[51] Int. Cl.³ .............................. G08G 1/12
[52] U.S. Cl. ................... 340/995; 73/178 R; 73/504; 364/457; 364/460; 340/309.15
[58] Field of Search ............. 340/23, 24, 309.15, 340/995, 988; 364/457, 460, 449, 450; 73/178 R, 1 E, 504, 505, 516 LM; 343/451, 452; 33/356

[56] References Cited

U.S. PATENT DOCUMENTS

| | | | |
|---|---|---|---|
| 4,032,758 | 6/1977 | Lewis | 364/457 |
| 4,347,730 | 9/1982 | Fisher | 73/178 R |
| 4,402,050 | 8/1983 | Tagami | 364/460 |

FOREIGN PATENT DOCUMENTS 2927325 1/1981 Fed. Rep. of Germany ...... 364/449

Primary Examiner—James J. Groody
Attorney, Agent, or Firm—Irving M. Weiner; Pamela S. Burt

[57] ABSTRACT

A current location indicating apparatus for use in an automotive vehicle wherein a current location of the automotive vehicle is arithmetically obtained in terms of two-dimensional coordinates by a signal processing unit on the basis of the output from a distance detecting unit and the output from a bearing detecting unit, and the current location of the vehicle is visually indicated on the screen of a display from the thus-obtained data in connection with the current location thereof. The apparatus comprises, in operative combination, two different types of bearing detecting units, one being of a rate gyroscope type and the other being of an earth magnetism sensor type, and a bearing signal switching unit providing a selective switching function of the outputs from the two types of bearing detecting units.

4 Claims, 3 Drawing Figures

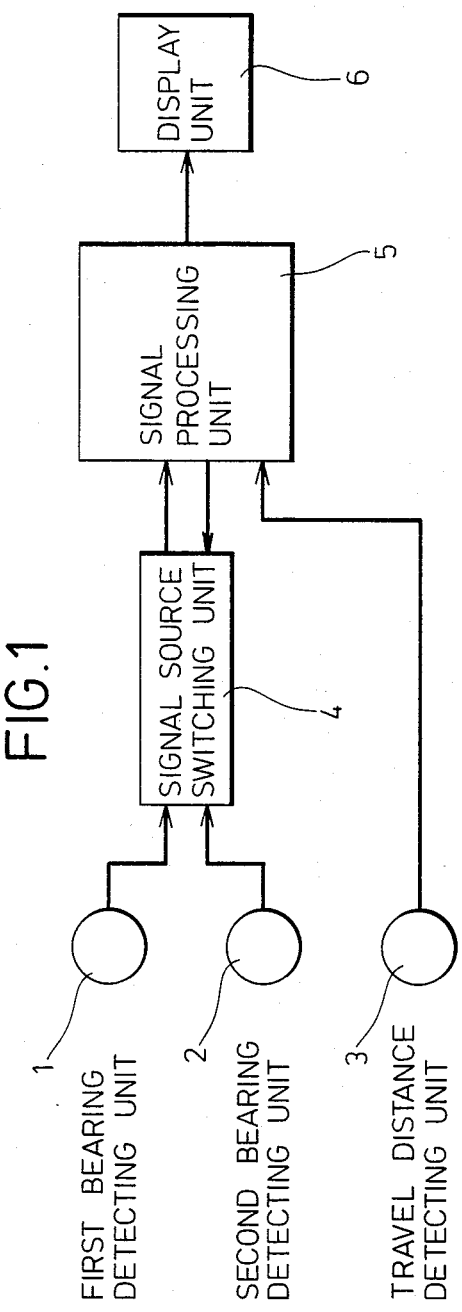
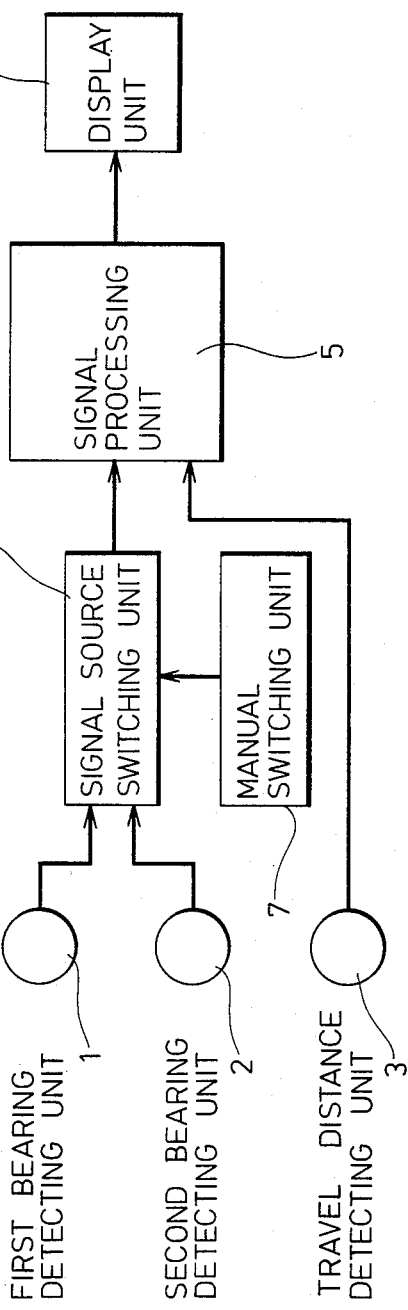

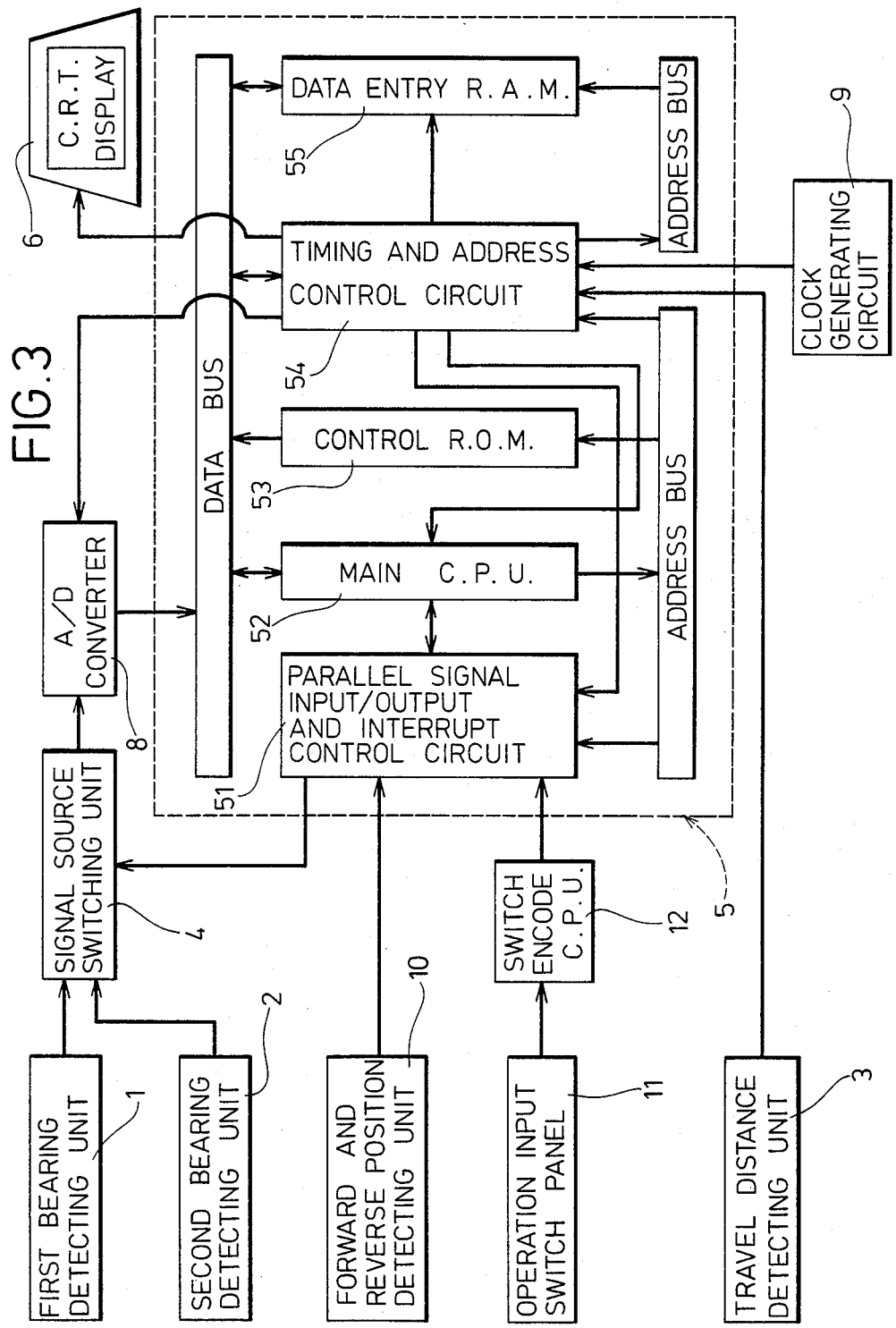

APPARATUS FOR VISUALLY INDICATING THE CURRENT LOCATION OF AN AUTOMOTIVE VEHICLE

BACKGROUND OF THE INVENTION

1. Field of the Invention

The present invention relates generally to a current location indicating device for use in a vehicle. More particularly, the invention relates to an improved apparatus for determining and visually indicating a current location of an automotive vehicle to the driver thereof, wherein a stable and quick-start locating operation is attained from the combination of an earth magnetism sensor and a rate gyroscope.

2. Description of Relevant Art

A known apparatus has been developed for the determination and visual indication of a current location of an automotive vehicle to the driver thereof, which comprises a travel distance counter section adapted to determine the current mileage or travel distance of an automotive vehicle in terms of, for example, the travel speed thereof, and a bearing detector section adapted to detect the current orientation and extent of azimuthal deviation of the vehicle in accordance with the travel direction thereof per a given distance from its starting point. The current location of the vehicle along its travel route is calculated arithmetically from the thus-obtained detection data, the result of which calculation is visually indicated on display for the driver of the vehicle, by way of spot information varying from time to time, upon a suitable road map on the display showing the travel route along which the vehicle is currently travelling.

In the known travel route indication apparatus of the aforesaid type, there is employed a bearing or orientation detecting means such as a rate gyroscope or the like which is adapted to detect a possible angular velocity as produced about the axis of yawing motion of the vehicle when it is turned one way or another while travelling. Although such gyroscope is advantageous in that it normally provides an accurate bearing detection for a relatively short period of service with sufficient insensitivity to external disturbances, it is disadvantageous in that it suffers from a rather poor initial or rise characteristic when powered-up, inasmuch as some time is required before it is ready to serve with a stable performance for a bearing detection.

On the other hand, it is known to provide an earth magnetism sensor serving as a bearing detection means, which is designed to sense the earth magnetism so as to detect a current relative relationship such as, for example, a current angular relationship between the orientation of the horizontal component of the earth magnetism and a current travel direction of the vehicle. Such an earth magnetism sensor can immediately provide a current bearing detection upon the switching-on of the power supply, however, it is inevitable that such particular magnetism sensor will be substantially susceptible to external disturbances from structures such as a railroad crossing and an iron bridge, or a large-sized truck having an iron box or housing passing by and alongside the vehicle in which the bearing detector of such type is provided.

With the conventional arrangement for detecting a current location of an automotive vehicle of the type as described above, it is very possible that spot information showing a current location of the vehicle on the display at the driver's seat will deviate from a predetermined course of travel due to thus-far accumulated errors in the detection as created from possible drifts of the gyroscope while the vehicle is travelling, to such an extent that such information will indicate an erroneous location of the vehicle on the display screen. When the vehicle is under such conditions, it is very difficult or even impossible for the driver of the vehicle to determine whether the displayed information on the screen is incorrect or if the vehicle is actually travelling in a different or incorrect way, resulting in substantial ambiguity.

The present invention effectively overcomes the aforesaid inconveniences and difficulties experienced with the conventional location detecting apparatus for use in an automotive vehicle.

SUMMARY OF THE INVENTION

It is a primary object of the present invention to provide an improved location detecting apparatus for use in an automotive vehicle which has both a quick-start initial operation and stable continuous operation in providing location detection with a substantial insensitivity to any disturbances from the environment in the proximity of the vehicle.

It is another object of the present invention to provide an improved location detecting apparatus for an automotive vehicle which incorporates an earth magnetism sensor providing a quick-start initial operation in locational detection of an automotive vehicle immediately upon power-up, without the necessity of waiting until the system reaches stability in performance after an undesirable rise-up time wait.

Another object of the present invention is to provide an improved location detecting apparatus for an automotive vehicle which incorporates a rate gyroscope which provides a stable and precise continuous locational detection of an automotive vehicle when switched-over from an earth magnetism sensor upon reaching a stable state and having a substantial insensitivity to any disturbances from the environment surrounding the vehicle.

The present invention provides an improved location detecting apparatus for use in an automotive vehicle wherein a current location of the automotive vehicle is arithmetically obtained in terms of two-dimensional coordinates by a signal processing unit on the basis of the output from a distance detecting unit and the output from a bearing detecting unit, and the current location of the vehicle is visually indicated on the screen of a display from the thus-obtained data in connection with the current location thereof. The apparatus comprises, in operative combination, two different types of bearing detecting means, one being of the rate gyroscope type and the other being of the earth magnetism sensor type, and a bearing signal switching unit which provides a selective switching function of the outputs from the two types of bearing detecting means.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a schematic block diagram showing the general construction of the current location detecting apparatus in accordance with a preferred embodiment of the present invention.

FIG. 2 is a schematic block diagram generally showing another embodiment of the invention.

FIG. 3 is a block diagram generally showing a typical circuit construction of the current location detecting apparatus according to the invention.

DETAILED DESCRIPTION OF PREFERRED EMBODIMENTS

With reference to FIG. 1, there is shown schematically the typical and basic construction of an improved current location detecting apparatus for use in an automotive vehicle according to a preferred embodiment of the present invention. The apparatus includes a first bearing detecting unit 1 which comprises a rate type gyroscope adapted, for example, to generate electric signals in proportion to a given current bearing data as well as a given quantity of azimuthal deviation from the current bearing of the automotive vehicle in accordance with a current travel direction taken by the vehicle. A second bearing detecting unit 2 comprises an earth magnetism sensor adapted to generate electric signals indicating the absolute bearing data in accordance with the current travel direction of the vehicle. A travel distance detecting unit 3 comprises, for example, a sensor or pulse generator of a photoelectric, electromagnetic or mechanical contact type and adapted to produce signals corresponding to a current travel distance or number of revolutions of the wheels of the vehicle. A signal source switching unit 4 is adapted to selectively switch the bearing signal outputs from the first and second bearing detecting units 1 and 2. A signal processing unit 5 is adapted to count the electric pulse signals from the travel distance detecting unit 3 so as to measure a current travel distance of the vehicle, determine a current travel direction of the vehicle from the bearing detection signal outputs from the signal source switching unit 4, and then arithmetically operate to obtain a current location of the vehicle in terms of two-dimensional coordinates at an interval of a predetermined unit travel distance of the vehicle in accordance with the results of determination upon such data as obtained from the units 1, 2, 3 and 4 as described above, thus centrally controlling the entire apparatus. A display unit 6 comprises, for example, a CRT display, a liquid crystal display or the like, and is adapted to visually indicate information on a current location of the vehicle as updated from time to time on the basis of the thus-obtained locating data of the vehicle as indicated varying from time to time on the two-dimensional coordinates from the signal processing unit 5.

The construction of the current location detecting apparatus for use in an automotive vehicle according to the present invention is such that the first and second bearing detecting units 1 and 2 are initially turned on at the same time upon the power-up of the power supply before the vehicle starts travelling. The signal processing unit 5 is arranged so as to operate the signal source switching unit 4 in such a manner that it functions to first cause the output of the second detecting unit 2 to be selected for the initial stage of bearing detection, thereafter automatically switching-over to the output of the first bearing detecting unit 1 when a stable state of the first detecting unit 1 comprising the rate gyroscope has been reached, after the lapse of rise-up time.

More specifically, the means which is designed to switch the bearing signals at the signal source switching unit 4 by functioning of the signal processing unit 5 is of such construction that the signal switching function of the signal source switching unit 4 is provided upon the receipt of the signal as given by the signal processing unit 5 after the lapse of a due time which is predetermined from an expected period during which the first bearing detecting unit 1 reaches the state of stability in performance. At the same time, there may be provided another means at the signal processing unit 5 for monitoring the output from the first bearing detecting unit 1 immediately upon power-up and determining whether or not the output from the first bearing detecting unit 1 is in a stable state. There is also provided a control means for causing the signal source switching unit 4 to select the output signal from the second bearing detecting unit 2 when it is determined that the output from the first detecting unit is not stable, and then switching-over to the output of the first bearing detecting unit 1 when the output from the first bearing detecting unit 1 is determined to be in a stable state. If such control means are provided, it will be understood that the signal source switching means 4 can effectively switch back to the output of the second bearing detecting unit 2 at any moment that the gyroscope in the first bearing detecting unit 1 is found to be unstable in its performance, and not only during the initial unstable state of the unit 1 during initial power-up.

Also, as a practical means for monitoring the output of the first bearing detecting unit 1, it is contemplated that the zero point of the gyroscope of the detecting unit 1 is monitored each time the vehicle stops, and that the moment that the time-based changes of such zero point is observed to be lower than a certain predetermined value may be taken as the point where the gyroscope reaches its stable state.

As an alternative means for selectively automatically switching the signal outputs from the first and second bearing detecting units 1 and 2 by means of the signal source switching unit 4 under the control of the signal processing unit 5, as typically shown in FIG. 2, there may be provided a manual switching unit 7 which may be operated manually by an operator of the system for the switching operation of bearing detecting signals in accordance with the operator's judgment made from time to time in reflection of the actual travel status of the vehicle. Moreover, it will be understood that it is also possible to provide this particular manual control in switching of the bearing detecting signals by way of the manual switching unit 7 in addition to the automatic signal switching operation by the signal source switching unit 4 under the control of the signal processing unit 5.

Referring now to FIG. 3, there is depicted a block diagram which shows, by way of a typical example, the general construction of the current location detecting apparatus of an automotive vehicle in accordance with the present invention.

In the particular construction shown in FIG. 3, there is provided the signal processing unit 5 which comprises a parallel signal input/output and interrupt control circuit 51, a main CPU 52, a control ROM 53, a timing and address control circuit 54, and a data entry RAM 55, wherein the signal source switching unit 4 functions as an analog switch to selectively switch the outputs from the first and second bearing detecting units 1 and 2 upon the receipt of switching signals from the parallel signal input/output and interrupt control circuit 51, the thus-selected bearing detection signals being transmitted to the data bus of the signal processing unit 5 through the analog/digital (A/D) converter 8. Concurrently, the timing and address control circuit 54 is directly fed with the output from the travel distance detecting unit 3 and also with the timing clock from the clock generating circuit 9, the timing and address control circuit 54 transmitting the horizontal and vertical synchronizing signals and the video signals to the CRT display 6′, and the control signals to the A/D converter 8. On the other hand, the output signals from the forward and reverse position detecting unit 10 which is adapted to detect the forward and reverse driving states of the vehicle is transmitted to the parallel input-output and interrupt control circuit 51 in such a manner that it can correct a current bearing detection signal as fed by the A/D converter 8 and the pulse signals as fed by the travel distance detecting unit 3, at the moment that a reverse driving state is detected. In addition, there is provided an operation input switch panel 11 which enables the scale of indication on the screen of the CRT display 6′ to be changed as desired and the retrieving mark to be indicated on the screen of the CRT display 6′ wherever necessary, so that a current location of the vehicle can be checked visually and immediately on the indication on the screen, and a switch encode CPU 12 which is adapted to transfer varied operating command signals to the parallel input/output and interrupt control circuit 51 in accordance with the due combination of the contacts of the switch panel 11.

As described in detail hereinabove, according to the present invention there is provided an improved current location indicating apparatus for use in an automotive vehicle wherein a current location of the automotive vehicle in terms of two-dimensional coordinates is arithmetically obtained by the signal processing unit on the basis of the outputs from the travel distance detector and the bearing detector, and the current location of the vehicle is visually indicated on the screen of the display from the thus-obtained data in connection with the current location. The apparatus comprises, in operative combination, two different types of bearing detectors, one being of the rate gyroscope type and the other being of the earth magnetism sensor type, and the bearing signal switching means which can afford a selective switching function of the outputs from the two types of bearing detectors. In this manner, the output from the bearing detector employing the earth magnetism sensor is advantageously adopted for a rapid start-up operation during the initial power-up state or otherwise when the gyroscope has not yet reached a stable state, with the output from the bearing detector employing the rate gyroscope being switched-in for an accurate location detection of the vehicle upon reaching the stable state thereof, so that the current location of the vehicle may be visually indicated on the display with constant accuracy and stability in operation.

It will now be understood that the objects as set forth hereinabove among those made apparent from the preceding description are effectively attained, and because certain changes and modifications may be made in the foregoing without departing from the spirit and scope of the invention, it is intended that all matter contained in the foregoing description or shown in the accompanying drawings shall be interpreted as illustrative and not limiting.

It is also to be understood that the appended claims are intended to cover all of such generic and specific features particular to the invention as disclosed herein and all statements relating to the scope of the invention which might be said to fall thereunder.

We claim:

1. A current location indicating apparatus for use in an automotive vehicle wherein a current location of said automotive vehicle is arithmetically obtained in terms of two-dimensional coordinates by a signal processing unit on the basis of the outputs from a travel distance detecting unit and a bearing detecting unit, and the current location of the vehicle is visually indicated on the screen of a display from the thus-obtained data in connection with the current location thereof, which comprises, in operative cooperation:

two different types of bearing detecting means, one said bearing detecting means being of a rate gyroscope type and the other bearing detecting means being of an earth magnetism sensor type; and bearing signal switching means for selectively switching between the outputs from said two types of bearing detecting means.

2. A current location indicating apparatus according to claim 1, wherein:

said signal processing unit is adapted to generate signals to cause said bearing signal switching means to be operated automatically in the switching function thereof such that the output from said bearing detecting means of said earth magnetism sensor type is selected for bearing detection of said vehicle during the period when said bearing detecting means of said rate gyroscope type has not yet reached a stable state in performance, and thereafter switching-over to the output from said bearing detecting means of said rate gyroscope type upon reaching said stable state in performance thereof.

3. A current location indicating apparatus according to claim 1, wherein:

said signal processing unit is adapted to generate signals to cause said bearing signal switching means to be operated automatically in the switching function thereof; and said signal processing unit is adapted to monitor the output from said bearing detecting means of said rate gyroscope type such that the output from said bearing detecting means of said earth magnetism type is selected for bearing detection of said vehicle upon detecting that said bearing detecting means of said rate gyroscope type is still unstable in performance, and that the output from said bearing detecting means of said rate gyroscope type is switched-in for bearing detection upon reaching the stable state thereof.

4. A current location indicating apparatus according to claim 1, further comprising:

manual switching means for optionally and manually switching the bearing detection signals from said bearing signal switching means.

* * * * *